United States Patent
Ito

(10) Patent No.: US 11,752,432 B2
(45) Date of Patent: Sep. 12, 2023

(54) INFORMATION PROCESSING DEVICE AND METHOD OF CAUSING COMPUTER TO PERFORM GAME PROGRAM

(71) Applicant: SEGA CORPORATION, Tokyo (JP)

(72) Inventor: Shinpei Ito, Tokyo (JP)

(73) Assignee: SEGA CORPORATION, Tokyo (JP)

(*) Notice: Subject to any disclaimer, the term of this patent is extended or adjusted under 35 U.S.C. 154(b) by 0 days.

(21) Appl. No.: 16/747,984

(22) Filed: Jan. 21, 2020

(65) Prior Publication Data
US 2020/0155941 A1 May 21, 2020

Related U.S. Application Data

(63) Continuation of application No. PCT/JP2018/022795, filed on Jun. 14, 2018.

(30) Foreign Application Priority Data

Sep. 15, 2017 (JP) ................... 2017-178172

(51) Int. Cl.
*A63F 13/533* (2014.01)
*A63F 13/2145* (2014.01)
(Continued)

(52) U.S. Cl.
CPC ........ *A63F 13/533* (2014.09); *A63F 13/2145* (2014.09); *A63F 13/42* (2014.09); *G06F 3/0412* (2013.01); *A63F 2300/1075* (2013.01)

(58) Field of Classification Search
CPC .................. A63F 13/2145; A63F 13/42; A63F 2300/1075
(Continued)

(56) References Cited

U.S. PATENT DOCUMENTS 6,343,991 B1* 2/2002 Armstrong ........... H01H 13/785
463/37
8,246,459 B2* 8/2012 Ryu ...................... A63F 13/814
463/36
(Continued)

FOREIGN PATENT DOCUMENTS

JP 2012-249880 A 12/2012
JP 5879007 B1 3/2016
(Continued)

OTHER PUBLICATIONS

International Preliminary Report on Patentability issued in corresponding International Application No. PCT/JP2018/022795 dated Mar. 17, 2020, with translation (13 pages).
(Continued)

*Primary Examiner* — Chase E Leichliter
(74) *Attorney, Agent, or Firm* — Osha Bergman Watanabe & Burton LLP

(57) ABSTRACT

An information processing device includes: a controller that generates a game image of an object disposed in a virtual game space; and a touch panel that displays the game image. The touch panel detects an input of a user's touch operation on the game image and outputs, to the controller, a detection signal indicating the detection of the input. The controller determines a contact surface area at an indicated position on the touch panel indicated by the user's touch operation based on the detection signal. The controller determines, based on a size of the contact surface area, whether ae first operation or a second operation has been inputted. The controller performs a first control related to the object in response to the first operation, and a second control related to the object when the second operation has been inputted.

8 Claims, 8 Drawing Sheets

Contact surface area A

Contact surface area B

(51) Int. Cl.
*A63F 13/42* (2014.01)
*G06F 3/041* (2006.01)

(58) Field of Classification Search
USPC .................................................. 463/31, 37
See application file for complete search history.

(56) References Cited

U.S. PATENT DOCUMENTS

| | | | | |
|---|---|---|---|---|
| 8,512,115 B2* | 8/2013 | Namba | A63F 13/42 | 463/4 |
| 8,519,965 B2* | 8/2013 | Cady | G06F 3/04166 | 345/173 |
| 8,954,890 B2* | 2/2015 | Haussila | G06F 3/04842 | 715/834 |
| 9,891,743 B2* | 2/2018 | Yanagawa | G06F 1/1626 | |
| 9,952,755 B2* | 4/2018 | Ogiso | G06F 3/04845 | |
| 10,268,364 B2* | 4/2019 | Park | G06F 3/04886 | |
| 10,369,470 B2* | 8/2019 | Gerhard | A63F 13/44 | |
| 2003/0017863 A1* | 1/2003 | Takahashi | A63F 13/5375 | 463/3 |
| 2004/0248650 A1* | 12/2004 | Colbert | A63F 13/08 | 463/37 |
| 2005/0202869 A1* | 9/2005 | Miyamoto | A63F 13/26 | 463/36 |
| 2005/0227217 A1* | 10/2005 | Wilson | G06K 9/20 | 434/337 |
| 2006/0010400 A1* | 1/2006 | Dehlin | G06F 3/0421 | 715/856 |
| 2006/0025218 A1* | 2/2006 | Hotta | A63F 13/06 | 463/37 |
| 2006/0197753 A1* | 9/2006 | Hotelling | G06F 3/0412 | 345/173 |
| 2006/0258453 A1* | 11/2006 | Kando | A63F 13/52 | 463/36 |
| 2007/0097096 A1* | 5/2007 | Rosenberg | G06F 1/1626 | 345/173 |
| 2007/0270215 A1* | 11/2007 | Miyamoto | A63F 13/10 | 463/32 |
| 2008/0125202 A1* | 5/2008 | Kamiyama | A63F 13/06 | 463/43 |
| 2008/0132333 A1* | 6/2008 | Kogo | G07F 17/3211 | 463/37 |
| 2008/0274780 A1* | 11/2008 | Yamada | A63F 13/70 | 463/11 |
| 2008/0291173 A1* | 11/2008 | Suzuki | A63F 13/2145 | 345/173 |
| 2008/0297492 A1* | 12/2008 | Shirakawa | A63F 13/426 | 345/179 |
| 2009/0051114 A1* | 2/2009 | Robbers | A63F 1/00 | 273/293 |
| 2009/0054124 A1* | 2/2009 | Robbers | G07F 17/3293 | 463/9 |
| 2009/0122018 A1* | 5/2009 | Vymenets | G06F 3/0488 | 345/173 |
| 2009/0247250 A1* | 10/2009 | Kato | A63F 13/837 | 463/2 |
| 2010/0066704 A1* | 3/2010 | Kasai | G06F 3/0418 | 345/175 |
| 2010/0083111 A1* | 4/2010 | de los Reyes | G06F 3/04886 | 715/702 |
| 2010/0141680 A1* | 6/2010 | Nashida | G06F 3/04883 | 345/642 |
| 2010/0265185 A1* | 10/2010 | Oksanen | G06F 3/0488 | 345/173 |
| 2010/0285881 A1* | 11/2010 | Bilow | A63F 9/24 | 463/37 |
| 2010/0287486 A1* | 11/2010 | Coddington | G06F 40/232 | 715/769 |
| 2010/0295806 A1* | 11/2010 | Homma | G06F 3/0488 | 345/173 |
| 2010/0321319 A1* | 12/2010 | Hefti | G06F 3/04883 | 345/173 |
| 2011/0001694 A1* | 1/2011 | Homma | G06F 3/0485 | 345/156 |
| 2011/0009195 A1* | 1/2011 | Porwal | A63F 13/426 | 463/37 |
| 2011/0014983 A1* | 1/2011 | Miller, IV | G06F 3/0488 | 463/37 |
| 2011/0057886 A1* | 3/2011 | Ng | G06F 3/04886 | 345/173 |
| 2011/0102464 A1* | 5/2011 | Godavari | G06F 3/0416 | 345/650 |
| 2011/0130182 A1* | 6/2011 | Namba | A63F 13/42 | 463/3 |
| 2011/0136558 A1* | 6/2011 | Terada | A63F 13/10 | 463/4 |
| 2011/0169762 A1* | 7/2011 | Weiss | G06F 3/04883 | 345/173 |
| 2011/0172013 A1* | 7/2011 | Shirasaka | A63F 13/92 | 345/173 |
| 2012/0034978 A1* | 2/2012 | Lim | A63F 13/235 | 463/36 |
| 2012/0052959 A1* | 3/2012 | Nishida | A63F 13/92 | 463/47 |
| 2012/0066627 A1* | 3/2012 | Furukawa | G06F 3/0488 | 715/768 |
| 2012/0169610 A1* | 7/2012 | Berkes | G06F 3/04166 | 345/173 |
| 2012/0212420 A1* | 8/2012 | Shin | G06F 3/04886 | 345/173 |
| 2012/0306775 A1* | 12/2012 | Miyachi | G06F 3/041 | 345/173 |
| 2013/0024806 A1* | 1/2013 | Funabashi | A63F 13/533 | 715/781 |
| 2013/0038532 A1* | 2/2013 | Okura | G06F 1/1694 | 345/158 |
| 2013/0045799 A1* | 2/2013 | Soelberg | A63F 13/22 | 463/31 |
| 2013/0058019 A1* | 3/2013 | Lee | G06F 3/04883 | 361/679.01 |
| 2013/0120258 A1* | 5/2013 | Maus | A63F 13/245 | 345/161 |
| 2013/0139079 A1* | 5/2013 | Kitao | G06F 3/041 | 715/764 |
| 2013/0141373 A1* | 6/2013 | Takuma | G06F 3/0488 | 345/173 |
| 2013/0167062 A1* | 6/2013 | Herring | G06F 3/04883 | 715/773 |
| 2013/0205208 A1* | 8/2013 | Kim | G11B 27/34 | 715/716 |
| 2013/0275868 A1* | 10/2013 | Haussila | G06F 3/0481 | 715/702 |
| 2013/0316813 A1* | 11/2013 | Derome | A63F 9/24 | 463/31 |
| 2013/0316817 A1* | 11/2013 | Tanzawa | A63F 13/822 | 463/31 |
| 2013/0321340 A1* | 12/2013 | Seo | G06F 1/1641 | 345/174 |
| 2014/0066195 A1* | 3/2014 | Matsui | A63F 13/06 | 463/30 |
| 2014/0195940 A1* | 7/2014 | Ogiso | G06F 3/04845 | 715/765 |
| 2014/0364214 A1* | 12/2014 | Ayoub | A63F 13/10 | 463/31 |
| 2015/0113477 A1* | 4/2015 | Haussila | G06F 3/0481 | 715/810 |
| 2016/0291794 A1* | 10/2016 | Kawamura | G06F 3/0418 | |
| 2016/0328069 A1* | 11/2016 | Berkes | A63F 13/25 | |
| 2018/0011529 A1* | 1/2018 | Tanzawa | G06F 3/01 | |

(56) References Cited

U.S. PATENT DOCUMENTS

| | | | | |
|---|---|---|---|---|
| 2018/0161674 A1* | 6/2018 | Kohara | ................ | A63F 13/426 |
| 2019/0339765 A1* | 11/2019 | Tanzawa | ................... | G06F 3/01 |
| 2020/0155941 A1* | 5/2020 | Ito | ........................ | A63F 13/533 |

FOREIGN PATENT DOCUMENTS

| | | | |
|---|---|---|---|
| JP | 2016-195864 A | 11/2016 |
| JP | 2017-000480 A | 1/2017 |
| JP | 2017-148398 A | 8/2017 |
| JP | 2017-153557 A | 9/2017 |

OTHER PUBLICATIONS

International Search Report issued in corresponding International Application No. PCT/JP2018/022795 dated Sep. 11, 2018 (5 pages).

\* cited by examiner

Contact surface area A

Contact surface area B

INFORMATION PROCESSING DEVICE AND METHOD OF CAUSING COMPUTER TO PERFORM GAME PROGRAM

CROSS-REFERENCE TO RELATED APPLICATIONS

This application is based on and claims priority under 35 U.S.C. § 119 from Japanese Patent Application No. 2017-178172 filed on Sep. 15, 2017, the contents of which are incorporated herein by reference.

BACKGROUND

Technical Field

The present invention generally relates to an information processing device and a method of causing a computer to perform a game program.

Related Art

In the conventional information processing devices, a plurality of operation buttons are disposed on a screen on which an object to be operated by the user is displayed, and the user uses a touch panel to perform touch operations on the operation buttons on the screen, thereby causing the object to perform the actions associated with those operation buttons (see, for example, Patent Literature 1).

Patent Literature 1: Japanese Patent No. 5,879,007

With an information processing device such as this, the more operation buttons that are disposed on the screen, the more actions that the object displayed on the screen can be made to perform. However, disposing many operation buttons on the screen can sometimes make it difficult to see the object. Consequently, there is the risk that such a button layout on the screen will hinder game operation, so that operation is less convenient.

SUMMARY

One or more embodiments can improve operability of the game.

An information processing device according to one or more embodiments comprises: an image generator that generates a game image of an object disposed in a virtual game space; a touch panel that detects a user's touch operation on the screen on which the game image is displayed; a contact surface area determination unit that determines the contact surface area at an indicated position on a screen indicated by the user's touch operation based on a detection signal from the touch panel; an operation input determination unit that determines whether an input is a first operation or a second operation based on the size of the determined contact surface area; and an object controller that performs a first control related to the object when a first operation has been inputted, and performs a second control related to the object when a second operation has been inputted.

With this information processing device, the user can selectively use either of two inputs, namely, a first operation and a second operation, merely by changing the size of the contact surface area when performing a touch operation. Accordingly, the number of operation buttons disposed on the screen can be reduced, so the object is easier to see and its operability can be improved.

According to one or more embodiments, the object controller controls a first action of the object as a first control related to the object when a first operation has been inputted, and controls a second action of the object as a second control related to the object when a second operation has been inputted. Consequently, when the user performs a touch operation, the operation can be performed while switching between the first action and the second action of the object merely by changing the size of the contact surface area. Therefore, it is not necessary for an operation button for causing the object to perform the first action and an operation button for causing the object to perform the second action to be disposed on the screen, so the object is easier to see and to operate.

According to one or more embodiments, the object controller controls a first action of the object as a first control related to the object when a first operation has been inputted, and controls a second action that is different from the first action, along with the first action of the object, as a second control related to the object when a second operation has been inputted. Consequently, when the user wants the object to perform a first action alone, or wants the object to perform a first action and a second action, all the user needs to do is change the size of the contact surface area in performing a touch operation. Also, there is no need for an operation button for causing the object to perform just the first action and an operation button for causing the object to perform both the first action and the second action to be disposed on the screen, so the object is easier to see and to operate.

According to one or more embodiments, the operation input determination unit determines whether or not a slide operation has been inputted by the movement in a predetermined direction of an indicated position on the screen indicated by the user's touch operation. The object controller controls the first action according to the predetermined direction when a slide operation and a first operation have been inputted, and controls the second action according to the predetermined direction when a slide operation and a second operation have been inputted. Consequently, combining a slide operation input with each of the two inputs of the first operation and the second operation affords greater variation of the actions performed by the object with a simple operation input.

According to one or more embodiments, the image generator is used to generate a game image when an object disposed in the virtual game space is viewed from a virtual camera. The object controller controls the virtual camera so that the appearance of the virtual game space changes when viewed from the viewpoint of the object, as a first control related to the object, when a first operation has been inputted, and controls the action of the object when a second operation has been inputted. Consequently, when the user performs a touch operation, the operation can be performed while switching between the action of the virtual camera and the action of the object merely by changing the size of the contact surface area. Therefore, it is not necessary for an operation button for the action of the virtual camera and an operation button for the action of the object to be disposed on the screen, so the object is easier to see and to operate.

According to one or more embodiments, the image generator is used to generate a game image when an object disposed in the virtual game space is viewed from a virtual camera. The object controller controls the virtual camera so that the appearance of the virtual game space changes when viewed from the viewpoint of the object, as a first control related to the object, when a first operation has been inputted, and controls the virtual camera so that the appearance of the virtual game space changes when viewed from the viewpoint of the object, as a second control related to the object, and also controls the action of the object, when a second operation has been inputted. Consequently, when the user wants to operate the virtual camera or to operate the object in addition to operating the virtual camera, all the user needs to do is change the size of the contact surface area in performing a touch operation. Also, there is no need for an operation button for operating the virtual camera and an operation button for operating the object to be disposed on the screen, so the object is easier to see and to operate.

According to one or more embodiments, the operation input determination unit determines whether or not a slide operation has been inputted by the movement in a predetermined direction of an indicated position on a screen indicated by a user's touch operation. The object controller controls the virtual camera according to the predetermined direction when a slide operation and a first operation have been inputted, and controls the action of the object according to the predetermined direction when a slide operation and a second operation have been inputted. Consequently, combining a slide operation input with each of the two inputs of the first operation and the second operation affords greater variation of the actions performed by the object with a simple operation input.

According to one or more embodiments, the contact surface area determination unit determines the contact surface area at an indicated position in the first area on the screen indicated by the user's touch operation, and determines the contact surface area at an indicated position in the second area on the screen indicated by the user's touch operation. The operation input determination unit determines whether an input is a first operation or a second operation based on the size of the contact surface area at the indicated position in the first area on the screen, and determines whether an input is a first operation or a second operation based on the size of the contact surface area at the indicated position in the second area on the screen. Consequently, if the operation area on the screen is divided up into a first area and a second area, the first operation and the second operation can be inputted for each of these areas.

According to one or more embodiments, an information processing device includes: a controller that generates a game image of an object disposed in a virtual game space; and a touch panel connected to the controller and that displays the game image. The touch panel detects an input of a user's touch operation on the game image and outputs, to the controller, a detection signal indicating the detection of the input. The controller determines a contact surface area at an indicated position on the touch panel indicated by the user's touch operation based on the detection signal. The user's touch operation comprises a first operation and a second operation. The controller determines, based on a size of the contact surface area, whether the first operation or the second operation has been inputted. The controller performs a first control related to the object in response to the first operation, and a second control related to the object in response to the second operation.

According to one or more embodiments, a method of causing a computer to perform a game program includes: generating, with a controller of the computer, a game image of an object disposed in a virtual game space; displaying, with a touch panel of the computer, the game image; detecting, with the touch panel, an input of a user's touch operation on the game image; determining, with the controller, a contact surface area at an indicated position on the touch panel indicated by the user's touch operation based on a detection signal indicating the detection of the input; determining, with the controller, whether a first operation or a second operation has been inputted based on a size of the contact surface area; and performing, with the controller: a first control related to the object in response to the first operation; and a second control related to the object in response to the second operation.

One or more embodiments makes it possible to improve operability of the game.

DETAILED DESCRIPTION

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes. One or more embodiments can be broadly applied to an information processing device, program, information processing system, or the like that employs games that can be played on a touch panel.

System Configuration

Figure 1:
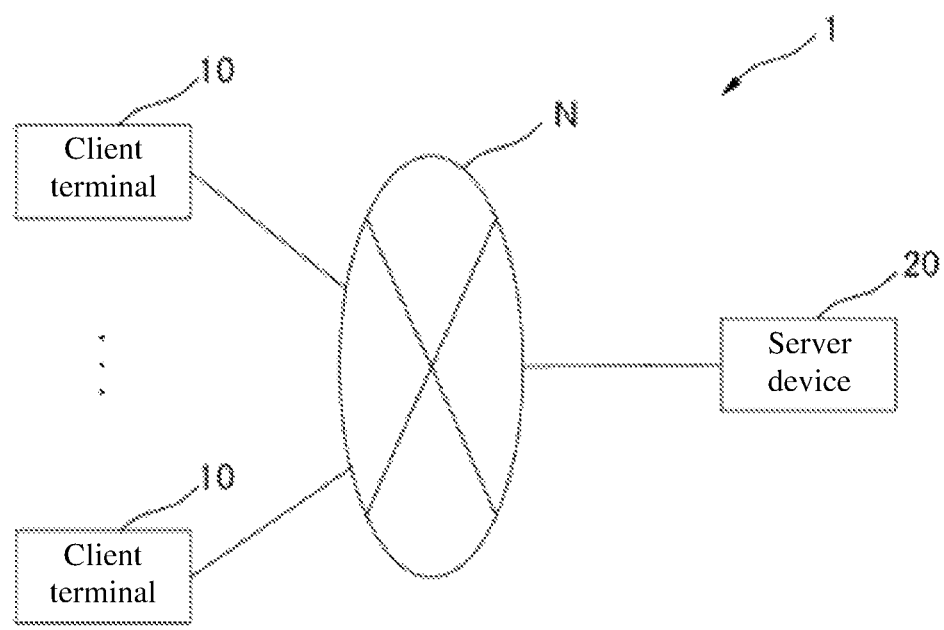
FIG. 1 is a configuration diagram showing an example of an information processing system 1 according to one or more embodiments.

FIG. 1 is a configuration diagram showing an example of an information processing system 1 according to one or more embodiments. As shown in FIG. 1, in the information processing system 1 according to one or more embodiments, one or more client terminals 10 and a server device 20 are connected via a network N.

The client terminal 10 is a terminal device such as a smartphone, a tablet, or a PC operated by a user, or a home or business dedicated game device. The server device 20 performs management and control of the game played by the user at the client terminal 10, fee processing within the game, and so forth. The network N is the Internet or the like, and includes mobile wireless base stations.

In addition to the client/server type of information processing system 1 shown in FIG. 1, one or more embodiments are also applicable to a single game device (information processing device) if a mechanism for handling fee processing in the game is separately provided. The information processing system 1 in FIG. 1 is just an example, and it should go without saying that there are many possible different system configurations, depending on the application and purpose. For example, the server device 20 in FIG. 1 may be configured to be distributed among a plurality of computers.

Hardware Configuration

Client Terminal

Figure 2:
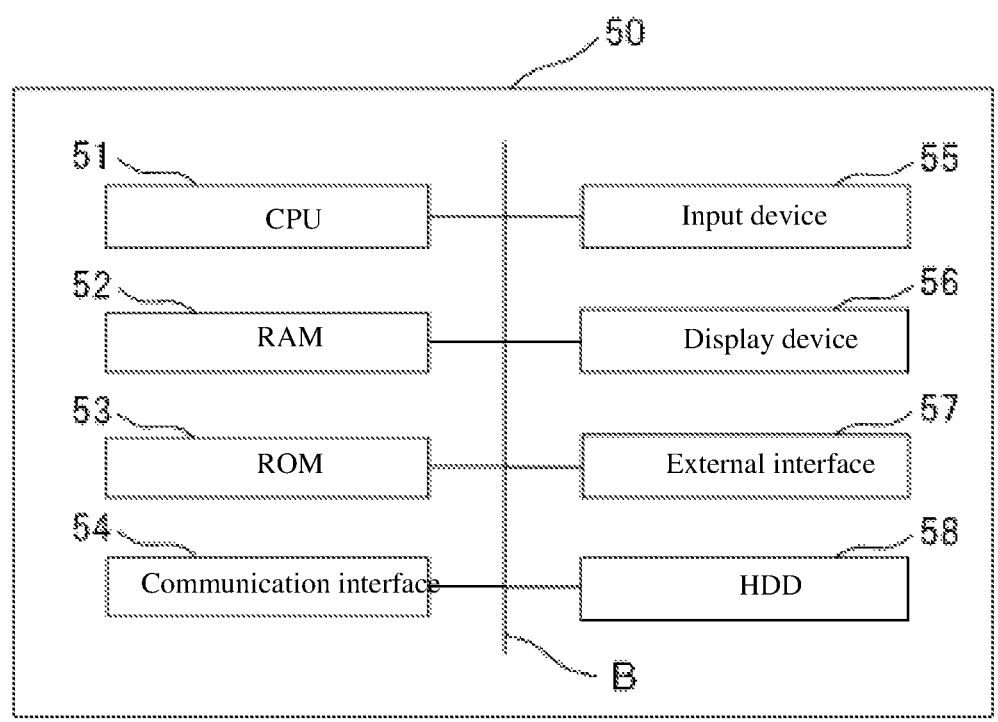
FIG. 2 is a hardware configuration diagram showing an example of a computer 50 according to one or more embodiments.

FIG. 2 is a hardware configuration diagram showing an example of a computer 50 according to one or more embodiments. The client terminal 10 according to one or more embodiments is, for example, a computer 50 having the hardware configuration shown in FIG. 2. The computer 50 is an example of an information processing device.

As shown in FIG. 2, the computer 50 includes a Central Processing Unit (CPU) 51, a Random Access Memory (RAM) 52, a Read Only Memory (ROM) 53, a communication interface 54, an input device 55, a display device 56, an external interface 57, a Hard Disk Drive (HDD) 58. These are connected to each other by a bus line B.

The CPU 51 is an arithmetic unit that implements control and functions of the entire computer by reading programs and data from a storage device such as the ROM 53 or the HDD 58 onto the RAM 52, and executing various kinds of processing based on the read programs and data.

The RAM 52 is an example of a volatile semiconductor memory (storage device) for temporarily storing programs and data, and is also used as a work area when the CPU 51 executes various processing.

The ROM 53 is an example of a nonvolatile semiconductor memory (storage device) that can hold programs and data even when the power is turned off. The ROM 53 stores programs and data such as BIOS, OS settings, and network settings that are executed when the computer 50 is started up.

The communication interface 54 is used to connect the computer 50 to the network N. This allows the computer 50 to perform data communication via the communication interface 54.

The input device 55 is used by a user or administrator to input various signals. The input device 55 is, for example, a touch panel, operation keys or buttons, a keyboard, a mouse, or another such operation device.

The client terminal 10 in one or more embodiments has at least a touch panel. The touch panel is constituted by a capacitance type of panel stacked on the display device 56. With this touch panel, when a touch operation is performed with a user's finger, a touch pen, or the like, the transparent electrodes arranged in a grid pattern detect a change in capacitance and output the resulting detection signal. In one or more embodiments, the position of the center of gravity determined from the range of the transparent electrodes where a change in capacitance has occurred is specified as the indicated position (contact position) on the screen. Also, the range of the transparent electrodes where a change in capacitance has occurred is specified as the contact surface area at the indicated position on the screen.

The display device 56 is used to display various kinds of information on a screen for the user who is using the touch panel to play a game. The display device 56 is, for example, a liquid crystal, organic electroluminescence, or other such display.

The external interface 57 is used to connect to an external device so that data communication is possible. This allows the computer 50 to read from and/or write to a recording medium via the external interface 57. The external device is, for example, a flexible disk, a CD, a DVD, an SD memory card, a USB memory, or another such recording medium.

The HDD 58 is an example of a nonvolatile storage device that stores programs and data. The stored programs and data include an OS, which is the basic software for controlling the entire computer, applications that provide the various functions on the OS, and so forth.

Instead of the HDD 58, a drive device in which a flash memory is used as a storage medium (such as a solid state drive (SSD)) may be used.

The client terminal 10 according to one or more embodiments can implement the various kinds of processing discussed below by executing a program on the computer 50 having the hardware configuration described above.

Software Configuration

Client Terminal

Figure 3:
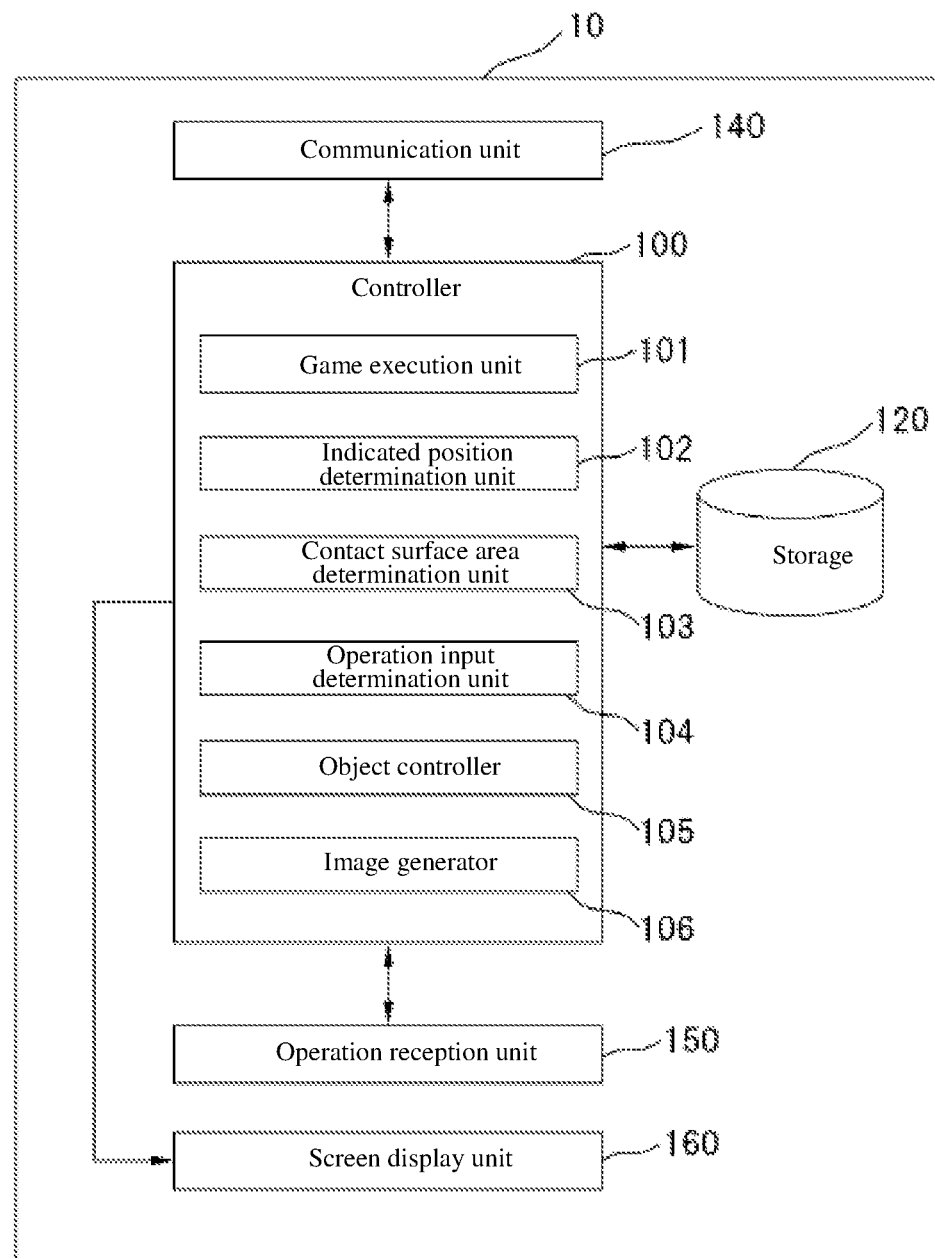
FIG. 3 is a functional block diagram showing an example of a client terminal 10 according to one or more embodiments.

FIG. 3 is a functional block diagram showing an example of the client terminal 10 according to one or more embodiments. The client terminal 10 according to one or more embodiments is realized by the functional blocks shown in FIG. 3, for example.

The client terminal 10 according to one or more embodiments executes a program to realize a controller 100, a storage 120, a communication unit 140, an operation reception unit 150, and a screen display unit 160.

The controller 100 has a function of executing various kinds of processing in the client terminal 10. The controller 100 includes a game execution unit 101, an indicated position determination unit 102, a contact surface area determination unit 103, an operation input determination unit 104, an object controller 105, and an image generator 106.

The game execution unit 101 controls the progress of various games (such as action games) that can be played on the client terminal 10 based on the game operation received by the client terminal 10 from the user.

The indicated position determination unit 102 determines the indicated position on the screen indicated by the user's touch operation based on the detection signal from the touch panel. For example, the indication position determination unit 102 determines the indicated position (contact position) on the screen that is indicated by the user's touch operation based on the position of the transparent electrode where a change in capacitance has occurred, from among the transparent electrodes arranged in a grid pattern.

The contact surface area determination unit 103 determines the contact surface area at the indicated position on the screen indicated by the user's touch operation based on the detection signal from the touch panel. For example, the contact surface area determination unit 103 determines the contact surface area at the indicated position on the screen indicated by the user's touch operation (for example, the center position of a circle and its radius) based on range of the transparent electrodes where a change in capacitance has occurred, from among the transparent electrodes arranged in a grid pattern.

The operation input determination unit 104 determines the type of game operation inputted by the user who is using the touch panel to play a game. For example, the operation input determination unit 104 determines whether an input is a first operation or a second operation based on the size of the contact surface area at the indicated position on the screen determined by the contact surface area determination unit 103. This first operation and second operation will be described below. Also, it is determined whether or not a slide operation has been inputted by the movement in a predetermined direction of an indicated position on a screen indicated by a user's touch operation, for example.

The object controller 105 performs control related to objects disposed in the virtual game space. For example, based on the user's game operations (such as a first operation or a second operation), the movement, attack, or the like of the object in the virtual game space is controlled, or a virtual camera is controlled so that the appearance of the virtual game space changes when viewed from the viewpoint of the object. For example, the object controller 105 controls the position, direction, and so forth of an object disposed in the virtual game space (world coordinate system) for each frame (for example, every 1/60 second). The object controller 105 also controls the viewpoint position, viewing direction, angle of view, and so forth of the virtual camera (virtual viewpoint) for generating an image that can be seen from the viewpoint of an object disposed in the virtual game space (world coordinate system).

The image generator 106 generates a game image of an object disposed in the virtual game space by performing drawing processing, and outputs the game image to the screen display unit 160. For example, the image generator 106 is such that an object and a virtual camera are disposed in a virtual game space with three-dimensional coordinates (X, Y, and Z) expressed in the world coordinate system, and coordinate conversion is performed on the viewpoint coordinate system using the virtual camera as a reference. Then, the object disposed in the viewpoint coordinate system is subjected to perspective transformation or the like, and the appearance of the virtual game space when viewed from the virtual camera is generated as a two-dimensional image. The image generator 106 also performs light source processing and other such interpolation processing, processing for mapping a texture to an object, and the like.

The operation reception unit 150 receives an operation from the user operating the client terminal 10. In addition, since the client terminal 10 according to one or more embodiments comprises a touch panel as mentioned above, it can receive operations unique to the touch panel, such as tapping, swiping, and flicking operations performed by the user.

The storage 120 stores installed applications (game applications and the like) and various information that is necessary in the client terminal 10. The communication unit 140 communicates with the server device 20. The screen display unit 160 acquires the game image generated by the image generator 106 and displays a screen on the client terminal 10.

The controller 100 of the client terminal 10 can be a browser type that receives page data written in HTML (Hyper Text Markup Language), etc., or the script included in the page data from the server device 20, and performs processing related to the game. The controller 100 of the client terminal 10 can also be an application type that performs processing related to a game based on an installed application. FIG. 3 shows an application type as an example.

Overview of Operation Method

Figure 4:
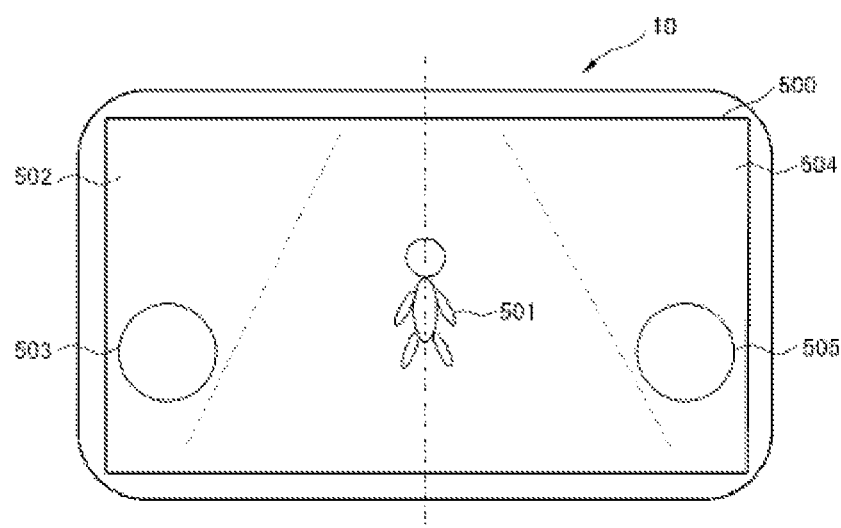
FIG. 4 is an external view showing an example of the client terminal 10 according to one or more embodiments.
Figure 5A:
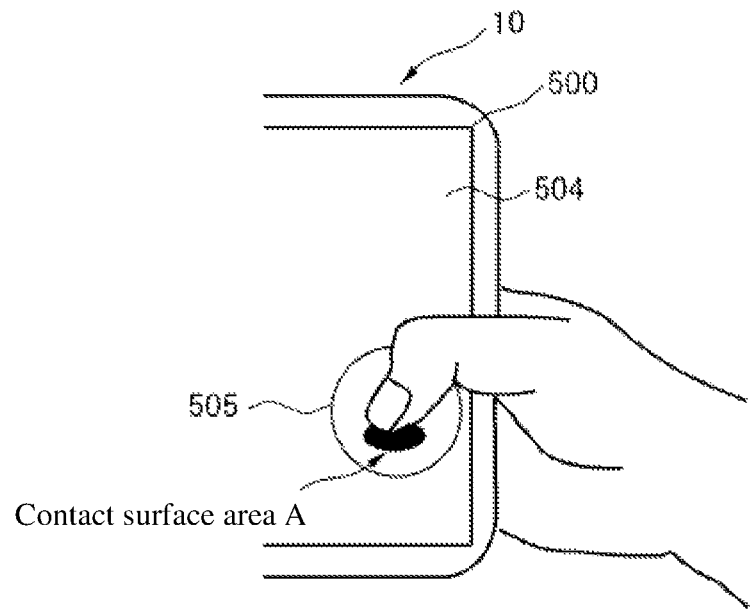
FIG. 5A is a diagram illustrating an operation state when the user performs a first operation using a touch panel according to one or more embodiments.
Figure 5B:
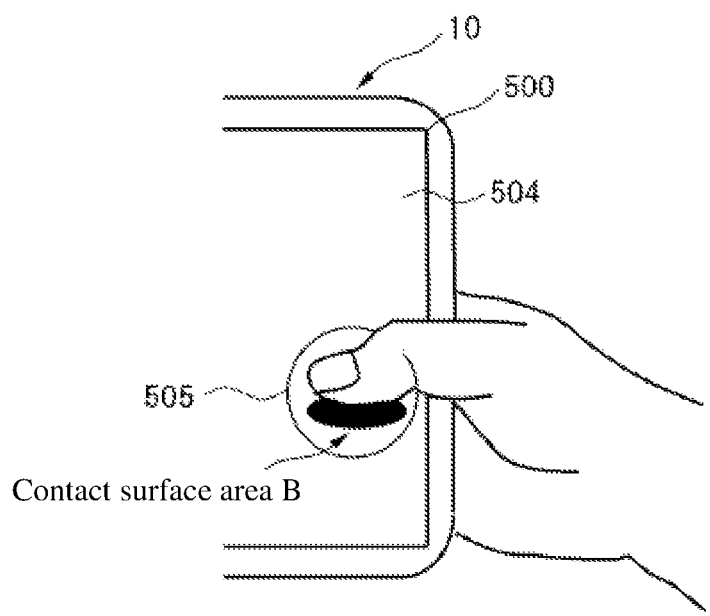
FIG. 5B a diagram illustrating an operation state when the user performs a second operation using the touch panel according to one or more embodiments.

An overview of the operation method of the client terminal 10 in one or more embodiments will now be described with reference to FIGS. 4 and 5. FIG. 4 is an external view showing an example of the client terminal 10 according to one or more embodiments. FIGS. 5A and 5B are diagrams illustrating a touch operation performed by the user using a touch panel. FIG. 5A shows the operation state when the user performs a first operation, and FIG. 5B shows the operation state when the user performs a second operation.

As shown in FIG. 4, the client terminal 10 in one or more embodiments has a touch panel 500 laminated over a screen. A character 501 (as an example of an object) is displayed on the screen of the client terminal 10, a left-hand button 503 is displayed in a left-hand area 502 (first area) on the left side of the screen, and a right-hand button 505 is displayed in a right-hand area 504 (second area) on the right side of the screen.

As for the character 501, a state in which the character 501 moves according to a user operation is displayed on the game screen. The left-hand button 503 and the right-hand button 505 are disposed on the game screen in a state of being fixed in their positions. The user can make the character 501 move by performing a first operation or a second operation on the left-hand button 503 and the right-hand button 505, respectively.

In one or more embodiments, as shown in FIG. 5A, the user performs the first operation by bringing a "tip of the finger" into contact with the area on the screen where the right-hand button 505 is disposed (the first operation can also be performed with the left-hand button 503). By contrast, as shown in FIG. 5B, the second operation is performed by bringing the "pad of the finger" into contact with the area on the screen where the right-hand button 505 is disposed (the second operation can also be performed with the left-hand button 503).

That is, the first operation is performed using the "tip of the finger," while the second operation is performed using the "pad of the finger," so the "contact surface area A" in the first operation is smaller than the "contact surface area B" in the second operation. Since the touch panel 500 can detect the "contact surface area A" in the first operation and the "contact surface area B" in the second operation, a touch operation corresponding to the size of each contact surface area will be recognized.

In one or more embodiments, when the first operation is performed by the user, a first control related to the character 501 is performed, and when the second operation is performed by the user, a second control regarding the character 501 is performed. For example, in the case of an action game, when the user performs a first operation (a touch operation with the "tip of the finger") within the area where the left-hand button 503 is disposed, the character 501 can be controlled to move slowly in the game field, but when the user performs a second operation (a touch operation with the "pad of the finger"), the character 501 can be controlled to quickly move (dash) in the game field. When the first operation (touch operation with the "tip of the finger") is performed by the user in the area where the right-hand button 505 is disposed, the virtual camera is controlled so that there is a change in the appearance of the game field when viewed from the viewpoint of the character 501, but when the user performs the second operation (touch operation with the "pad of the finger"), the character 501 can be controlled to attack an opponent who has appeared in the game field.

In this way, the user can selectively use either of two inputs, namely, the first operation and the second operation, merely by performing a touch operation while changing the size of the contact surface area. Therefore, there is no need to dispose both an operation button corresponding to the first operation and an operation button corresponding to the second operation on the screen, so the object is easier to see and operate. Also, the user can instantly switch between the two inputs (the first operation and the second operation) merely by changing the size of the contact surface area while touching the screen. Therefore, there is no need to wait a long time while touching to make a switch (as when holding down a touch) or to switch the input operation by first releasing the finger from the screen, so operability can be improved. Also, there is no need to perform an operation while paying attention to how hard to press to make a switch (as in a pressure operation), so operability can be improved. Operation

EXAMPLE 1

Figure 6:
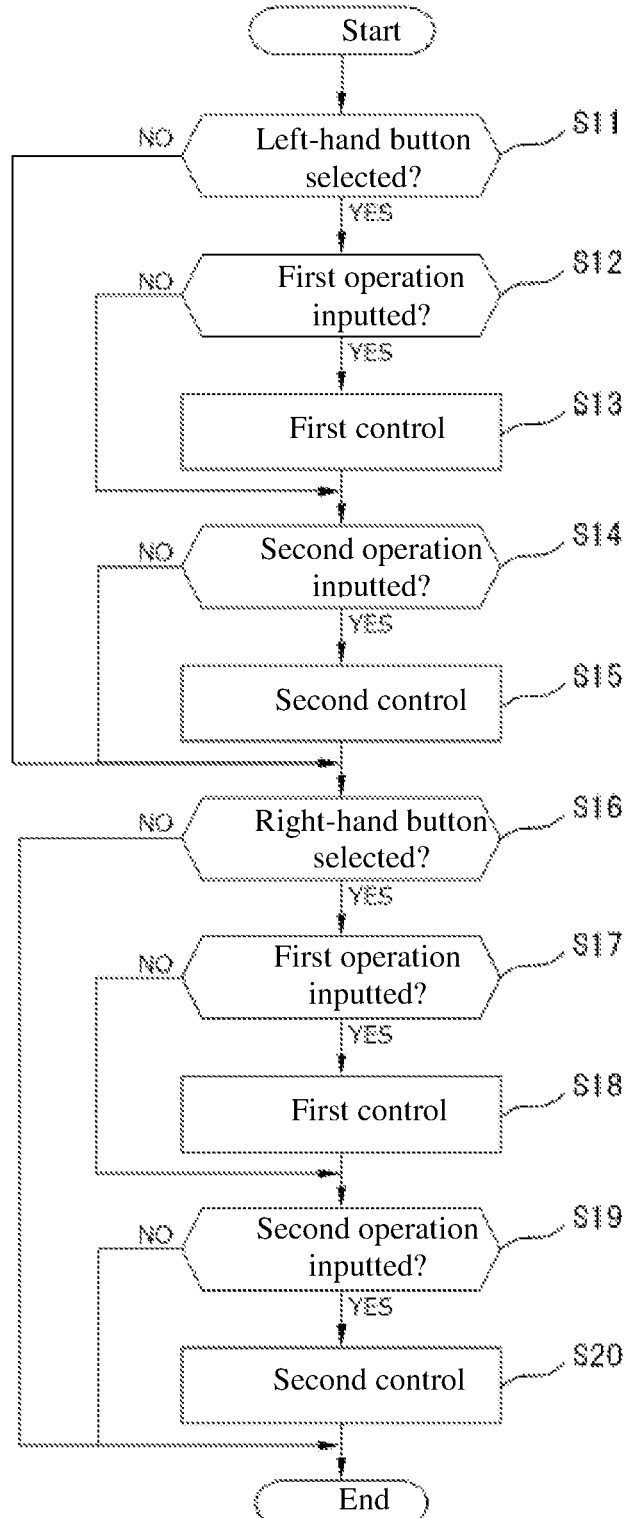
FIG. 6 is a flowchart illustrating an operation example (part 1) of the client terminal 10 according to one or more embodiments.

FIG. 6 is a flowchart illustrating an operation example (part 1) of the client terminal 10 in one or more embodiments.

The client terminal 10 determines whether or not the left-hand button 503 has been selected by a user's touch operation on the touch panel during the display of the game screen shown in FIG. 4 (step S11).

For example, the indicated position determination unit 102 determines the indicated position on the screen indicated by the user's touch operation based on a detection signal from the touch panel. The operation input determination unit 104 then determines whether or not the indicated position on the screen thus determined is included in the area of the left-hand button 503. If the determination is that the indicated position is included in the area of the left-hand button 503, it is determined that the left-hand button 503 has been selected by the user's touch operation.

Next, if it is determined that the left-hand button 503 has not been selected by the user's touch operation (No in step S11), the client terminal 10 proceeds to the processing in step S16 (discussed below), but if it is determined that the left-hand button 503 has been selected by the user's touch operation (Yes in step S11), the client terminal 10 determines whether or not the touch operation on the left-hand button 503 is the first operation (step S12).

For example, the contact surface area determination unit 103 determines the contact surface area at the indicated position on the screen indicated by the user's touch operation based on the detection signal from the touch panel. The operation input determination unit 104 then determines whether or not the size of the contact surface area at the indicated position on the screen thus determined is above a preset threshold value. If the determination is that the threshold value has not been exceeded, it is determined that the touch operation on the left-hand button 503 is the first operation.

Next, if it is determined that the touch operation on the left-hand button 503 is not the first operation (No in step S12), the client terminal 10 proceeds to the processing in step S14 (discussed below), but if it is determined that the touch operation on the left-hand button 503 is the first operation (Yes in step S12), the first control related to the character 501 is performed (step S13).

For example, when the first operation on the left-hand button 503 is performed by the user, the object controller 105 controls the character 501 to perform a first action as the first control related to the character 501. In one or more embodiments, as the first action of the character 501, control is performed so that the character 501 moves slowly in the game field at a low speed.

Next, if it is determined that the touch operation on the left-hand button 503 is not the first operation (No in step S12), the client terminal 10 determines whether or not the touch operation on the left-hand button 503 is the second operation (step S14).

For example, the contact surface area determination unit 103 determines the contact surface area at the indicated position on the screen indicated by the user's touch operation based on the detection signal from the touch panel. The operation input determination unit 104 then determines whether or not the size of the contact surface area at the indicated position on the screen thus determined is above a preset threshold value. If the determination is that the threshold value has been exceeded, it is determined that the touch operation on the left-hand button 503 is the second operation.

Next, if it is determined that the touch operation on the left-hand button 503 is not the second operation (No in step S14), the client terminal 10 proceeds to the processing in step S16 (discussed below), but if it is determined that the touch operation on the left-hand button 503 is the second operation (Yes in step S14), the second control related to the character 501 is performed (step S15).

For example, when the second operation on the left-hand button 503 is performed by the user, the object controller 105 controls the character 501 to perform a second action as the second control related to the character 501. In one or more embodiments, as the second action of the character 501, control is performed so that the character 501 moves quickly in the game field at high speed.

Next, if it is determined that the left-hand button 503 has not been selected by the user's touch operation (No in step S11), the client terminal 10 determines whether or not the right-hand button 505 has been selected by the user's touch operation on the touch panel (step S16).

For example, the indicated position determination unit 102 determines the indicated position on the screen indicated by the user's touch operation based on the detection signal from the touch panel. The operation input determination unit 104 then determines whether or not the indicated position on the screen thus determined is included in the area of the right-hand button 505. If the determination is that the indicated position is included in the area of the right-hand button 505, it is determined that the right-hand button 505 has been selected by the user's touch operation.

Next, if it is determined that the right-hand button 505 has not been selected by the user's touch operation (No in step S16), the client terminal 10 ends this processing, but if it is determined that the right-hand button 505 has been selected by the user's touch operation (Yes in step S16), the client terminal 10 determines whether or not the touch operation on the right-hand button 505 is the first operation (step S17).

For example, the contact surface area determination unit 103 determines the contact surface area at the indicated position on the screen indicated by the user's touch operation based on the detection signal from the touch panel. The operation input determination unit 104 then determines whether or not the size of the contact surface area at the indicated position on the screen thus determined is above a preset threshold value. If the determination is that the threshold value has not been exceeded, it is determined that the touch operation on the right-hand button 505 is the first operation.

Next, if it is determined that the touch operation on the right-hand button 505 is not the first operation (No in step S17), the client terminal 10 proceeds to the processing in step S19 (discussed below), but if it is determined that the touch operation on the right-hand button 505 is the first operation (Yes in step S17), the first control related to the character 501 is performed (step S18).

For example, when the first operation on the right-hand button 505 is performed by the user, the object controller 105 controls the character 501 to perform a first action as the first control related to the character 501. In one or more embodiments, as the first action of the character 501, the viewpoint position, viewing direction, angle of view, and so forth of the virtual camera disposed in the world coordinate system are controlled so that there is a change in the appearance of the game field when viewed from the viewpoint of the character 501.

Next, if it is determined that the touch operation on the right-hand button 505 is not the first operation (No in step S17), the client terminal 10 determines whether or not the touch operation on the right-hand button 505 is the second operation (step S19).

For example, the contact surface area determination unit 103 determines the contact surface area at the indicated position on the screen indicated by the user's touch operation based on the detection signal from the touch panel. The operation input determination unit 104 then determines whether or not the size of the contact surface area at the indicated position on the screen thus determined is above a preset threshold value. If the determination is that the threshold value has been exceeded, it is determined that the touch operation on the right-hand button 505 is the second operation.

Next, if it is determined that the touch operation on the right-hand button 505 is not the second operation (No in step S19), the client terminal 10 ends this processing, but if it is determined that the touch operation on the right-hand button 505 is the second operation (Yes in step S19), the second control related to the character 501 is performed (step S20).

For example, when the second operation on the right-hand button 505 is performed by the user, the object controller 105 controls the character 501 to perform a second action as the second control related to the character 501. In one or more embodiments, as the second action of the character 501, control can be performed so that the character 501 attacks an opponent who has appeared in the game field. Alternatively, as the second action of the character 501, the virtual camera can be controlled so that there is a change in the appearance of the game field when viewed from the viewpoint of the character 501, and the character 501 can be controlled to attack the opponent who has appeared in the game field.

In this way, the user can selectively use either of two inputs, namely, the first operation and the second operation, merely by performing a touch operation while changing the size of the contact surface area, so operability can be improved.

SPECIFIC EXAMPLE 2

Figure 7:
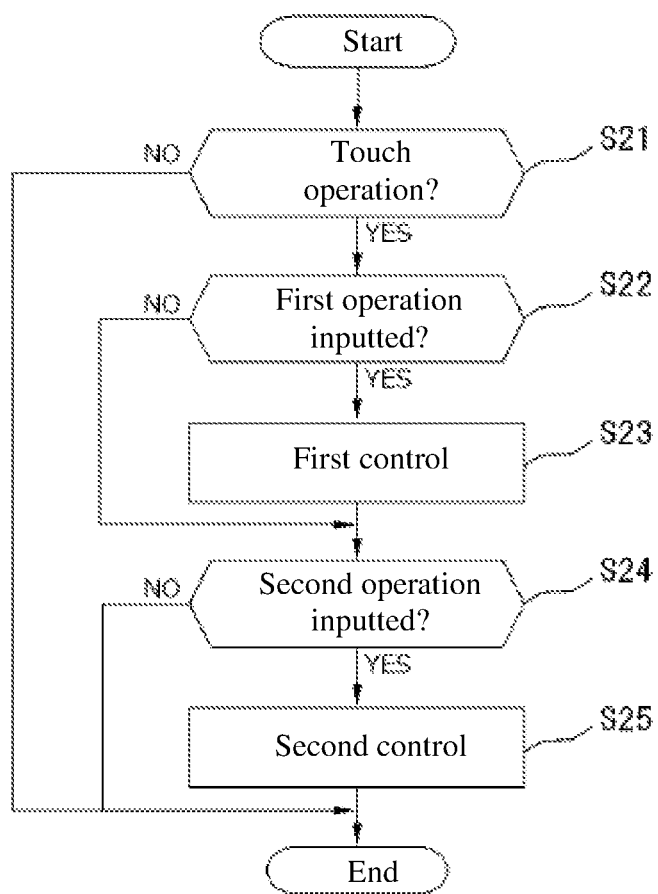
FIG. 7 is a flowchart illustrating an operation example (part 2) of the client terminal 10 according to one or more embodiments.

FIG. 7 is a flowchart illustrating an operation example (part 2) of the client terminal 10 in one or more embodiments. In Specific Example 2, unlike in Specific Example 1 given above, a case will be described in which the user can selectively use either of two inputs, namely, a first operation and a second operation, when performing a touch operation at an arbitrary position on the screen.

The client terminal 10 determines whether or not an arbitrary position on the screen is being indicated by the user's touch operation on the touch panel while the game screen is being displayed (step S21).

For example, the indicated position determination unit 102 can determine the indicated position on the screen indicated by the user's touch operation when a detection signal has been acquired from the touch panel. Accordingly, the operation input determination unit 104 determines whether or not an arbitrary position on the screen is being indicated by the user's touch operation based on whether or not an indicated position on the screen indicated by the user's touch operation has been determined.

Next, if it is determined that an arbitrary position on the screen has not been indicated by the user's touch operation on the touch panel (No in step S21), the client terminal 10 ends the processing, but if it is determined that an arbitrary position on the screen has been indicated by the user's touch operation (Yes in step S21), it is determined whether or not the user's touch operation is the first operation (step S22).

For example, the contact surface area determination unit 103 determines the contact surface area at the indicated position on the screen indicated by the user's touch operation based on the detection signal from the touch panel. The operation input determination unit 104 then determines whether or not the size of the contact surface area at the indicated position on the screen thus determined is above a preset threshold value. If the determination is that the threshold value has not been exceeded, it is determined that the user's touch operation is the first operation.

Next, if it is determined that the user's touch operation is not the first operation (No in step S22), the client terminal 10 proceeds to the processing in step S24 (discussed below), but if it is determined that the user's touch operation is the first operation (Yes in step S22), the first control related to the character is performed (step S23).

For example, when the first operation is performed by the user, the object controller 105 controls the character to perform the first action as the first control related to the character. In one or more embodiments, control is performed so that the character moves in the game field as the first action of the character.

Next, if it is determined that the user's touch operation is not the first operation (No in step S22), the client terminal 10 determines whether or not the user's touch operation is the second operation (step S24).

For example, the contact surface area determination unit 103 determines the contact surface area at the indicated position on the screen indicated by the user's touch operation based on the detection signal from the touch panel. The operation input determination unit 104 then determines whether or not the size of the contact surface area at the indicated position on the screen thus determined is above a preset threshold value. If the determination is that the threshold value has been exceeded, it is determined that the user's touch operation is the second operation.

Next, if it is determined that the user's touch operation is not the second operation (No in step S24), the client terminal 10 ends this processing, but if it is determined that the user's touch operation is the second operation (Yes in step S24), the second control related to the character is performed (step S25).

Figure 8:
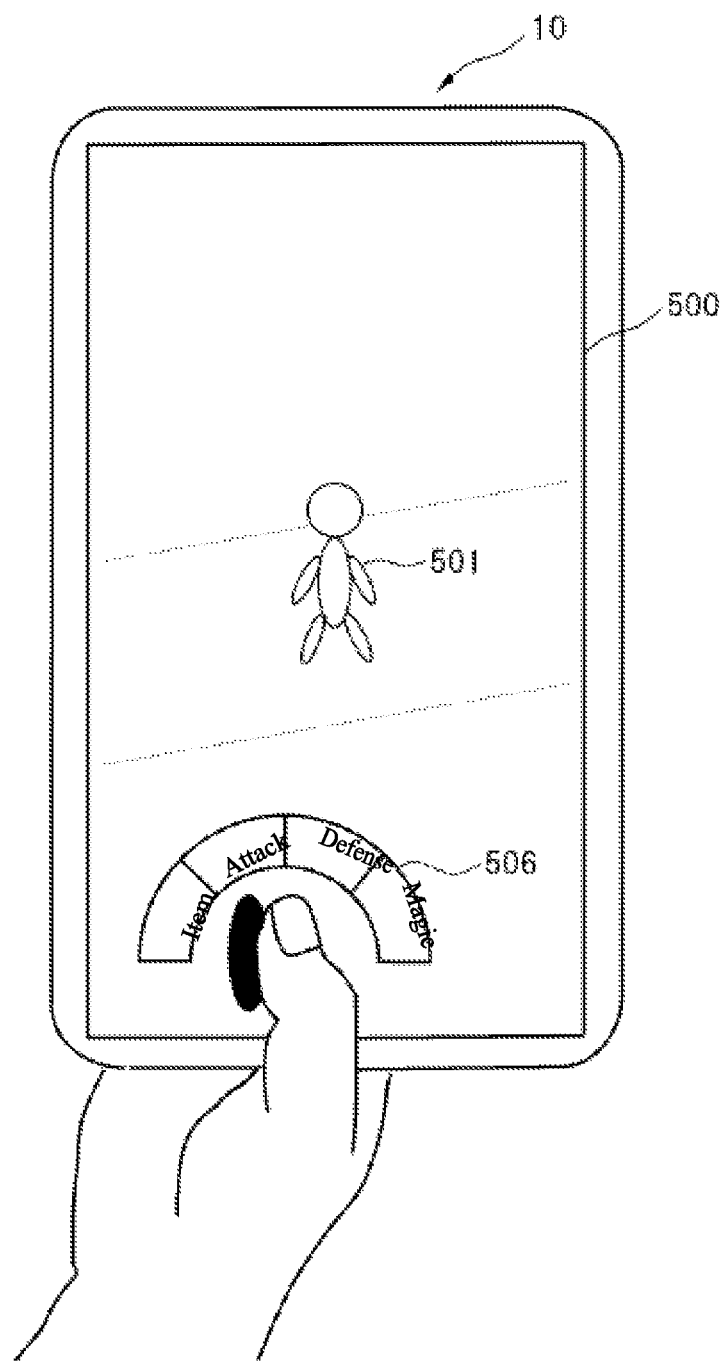
FIG. 8 is an external view of another example of the client terminal 10 according to one or more embodiments.

For example, when the second operation is performed by the user, the object controller 105 controls the character to perform a second action as the second control related to the character. In one or more embodiments, as the second action of the character, control is performed so that the character moves in the game field and attacks the opponent who has appeared in the game field. Alternatively, as shown in FIG. 8, a menu image 506 for selecting the action of the character 501 can be displayed around the user's indicated position as the second action of the character. After the menu image 506 is displayed, if the user selects a command by performing a touch operation such as tapping or flicking, the character 501 can be made to perform an action corresponding to that command.

In one or more embodiments as above, a case was described in which, when the first operation is performed by the user, the character is controlled to move in the game field as the first action of the character, and when the second operation is performed by the user, the character is controlled to attack while simultaneously moving as the second action of the character, but this is not the only option. For example, when the first operation is performed by the user, the character can be controlled to move horizontally in the game field as the first action of the character, and when the second operation is performed by the user, the character can be controlled to move vertically in the game field as the second action of the character. Consequently, it is also possible to control the character to move vertically along a wall (climb up the wall) by switching the user's touch operation from the current first operation to the section operation at the point when the horizontally moving character hits the wall. In addition to this, the character can be made to jump, open a door or treasure chest, talk to other characters, examine the ground of the game field, perform long-range attacks, perform short-range attacks, perform normal attacks (physical attacks, etc.), perform special attacks (invoking a skill or a special technique), or the like as the first action or the second action of the character.

Thus, the user can instantly switch between the two inputs of the first operation and the second operation merely by changing the size of the contact surface area while touching the screen, and this improves operability.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

Combination with Slide Operation

In one or more embodiments as above, the configuration may be such that a slide operation can be combined with each of the first operation and the second operation. That is, the user may be able to perform the first operation by bringing the "tip of the finger" into contact with the screen, while also performing a slide operation by continuously moving the "tip of the finger" that is still touching the screen. Also, the user may be able to perform the second operation by bringing the "pad of the finger" into contact with the screen, while also performing a slide operation by continuously moving the "pad of the finger" that is still touching the screen. For example, control may be such that when the user performs a first operation (a touch operation with the "tip of the finger") and a slide operation (a touch operation in which the "tip of the finger" is held down and moved in a predetermined direction), the character moves at a low speed according to the predetermined direction, and when the user performs a second operation (a touch operation with the "pad of the finger") and a slide operation (in which the "pad of the finger" is held down and moved in a predetermined direction), the character moves at high speed according to the predetermined direction. Also, for example, control may be such that when the user performs a first operation (a touch operation with the "tip of the finger") and a slide operation (a touch operation in which the "tip of the finger" is held down and moved in a predetermined direction), the virtual camera is controlled according to the predetermined direction, and when the user performs a second operation (a touch operation with the "pad of the finger") and a slide operation (a touch operation in which the "pad of the finger" is held down and moved in a predetermined direction), the character is moved according to the predetermined direction.

First and Second Operations

In one or more embodiments as above, an example was described in which, when the user performs a first operation (a touch operation with the "tip of the finger"), the character moves at a low speed, and when the user performs a second operation (a touch operation with the "pad of the finger"), the character moves at high speed, but it is also possible to switch around the character actions. That is, control may be such that when the user performs a first operation (a touch operation with the "tip of the finger"), the character moves at high speed, and when the user performs a second operation (a touch operation with the "pad of the finger"), the character moves slowly. In one or more embodiments as above, an example was given in which, when the user performs a first operation (a touch operation with the "tip of the finger"), the virtual camera is controlled, and when the user performs a second operation (a touch operation with the "pad of the finger"), the character is controlled to attack, but it is also possible to switch around the character actions. That is, when the user performs a first operation (a touch operation with the "tip of the finger"), the character may be controlled to attack, and when the user performs a second operation (a touch operation with the "pad of the finger"), the virtual camera may be controlled. The actions of the characters can also be switched around in other specific examples.

In one or more embodiments as above, an example was given in which two inputs, namely, a first operation and a second operation, can be performed based on the size of the contact surface area at the indicated position on the screen indicated by the user's touch operation, but one or more embodiments are not limited to this. For example, a plurality of threshold values can be set in advance, allowing three or more operation inputs to be used selectively according to the size of the contact surface area at the indicated position on the screen. As a result, a plurality of inputs consisting of a first operation, a second operation, a third operation, and so forth can be simply carried out with a single touch operation.

1 Information processing system
10 Client terminal
20 Server device
50 Computer
51 CPU
52 RAM
53 ROM
54 Communication interface
55 Input device
56 Display device
57 External interface
58 HDD
100 Controller
101 Game execution unit
102 Indicated position determination unit
103 Contact surface area determination unit
104 Operation input determination unit
105 Object controller
106 Image generator
120 Storage
140 Communication unit
150 Operation reception unit
160 Screen display unit
500 Touch panel
501 Character
502 Left-hand area
503 Left-hand button
504 Right-hand area
505 Right-hand button
506 Menu image
B Bus line
N Network

What is claimed is:

1. An information processing device, comprising:
a controller that generates a game image of an object viewed from a virtual camera disposed in a virtual game space; and
a touch panel connected to the controller and that:
displays the game image;
displays a left-hand button in a left-hand area on the touch panel;
displays a right-hand button in a right-hand area on the touch panel;
detects an input of a user's touch operation on the game image; and
outputs, to the controller, a detection signal indicating the detection of the input,
wherein
the controller identifies, within each of the left-hand and right-hand buttons, a contact surface area created by a user's tap gesture at an indicated position that is indicated by the user's touch operation based on the detection signal and that is different from a position of the object on the touch panel,
the user's touch operation is a single touch gesture comprising a first operation and a second operation,
the controller determines that, based on a size of the contact surface area within each of the left-hand and right-hand buttons,
the first operation has been inputted via each of the left-hand and right-hand buttons upon determining that the size of the contact surface area is less than a predetermined value, and
the second operation has been inputted via each of the left-hand and right-hand buttons upon determining that the size of the contact surface area is equal to or greater than the predetermined value,
such that a user can perform either of the first and second operations via each of the left-hand and right-hand buttons only by changing the size of the contact surface area,
the controller performs:
upon identifying the first operation in the contact surface area within the left-hand button, a first control,
upon identifying the second operation in the contact surface area within the left-hand button, a second control that is different from the first control action,
upon identifying the first operation in the contact surface area within the right-hand button, a third control that is different from the first control and the second control, and
upon identifying the second operation in the contact surface area within the right-hand button, a fourth control that is different from the first control, the second control, and the third control
such that, once the user performs the first and second operations via each of the left-hand and right-hand buttons by changing the size of the contact surface area within each of the left-hand and right-hand buttons, the first, second, third, and fourth controls are performed with respect to at least one of the object and the virtual camera.

2. The information processing device according to claim 1, wherein the user's touch operation is a tapping operation, a swiping operation, or a flicking operation.

3. The information processing device according to claim 1, wherein
the controller causes:
the object to move at a first speed as the first control, and
the object to move at a second speed that is different from the first speed as the second control.

4. The information processing device according to claim 3, wherein
the object includes a character,
the controller generates the game image when the character is viewed from the virtual camera, and
the controller controls the virtual camera so that an appearance of the virtual game space changes when viewed from a viewpoint of the character, as the third control.

5. The information processing device according to claim 4, wherein the controller causes the object to attack an opponent as the fourth control.

6. The information processing device according to claim 4, wherein
the controller, as the fourth control:
controls the virtual camera so that an appearance of the virtual game space changes when viewed from a viewpoint of the character, and
causes the character to attack an opponent.

7. The information processing device according to claim 1, wherein
the controller determines whether a slide operation has been inputted by a movement in a predetermined direction of the indicated position, and
the controller causes the object to move in the predetermined direction in response to the slide operation.

8. A method of causing a computer to perform a game program comprising:
generating, by a controller of the computer, a game image of an object viewed from a virtual camera disposed in a virtual game space;
displaying the game image on a touch panel of the computer;
displays a left-hand button in a left-hand area on the touch panel;
displays a right-hand button in a right-hand area on the touch panel;
detecting, via the touch panel, an input of a user's touch operation on the game image;
identifying, within each of the left-hand and right-hand buttons by the controller, a contact surface area created by a user's tap gesture at an indicated position, that is indicated by the user's touch operation based on a detection signal indicating the detection of the input and that is different from a position of the object on the touch panel, wherein the user's touch operation is a single touch gesture comprising a first operation and a second operation;
determining that, by the controller, based on a size of the contact surface area within each of the left-hand and right-hand buttons,
the first operation has been inputted via each of the left-hand and right-hand buttons upon determining that the size of the contact surface area is less than a predetermined value, and
the second operation has been inputted via each of the left-hand and right-hand buttons upon determining that the size of the contact surface area is equal to or greater than the predetermined value,
such that a user can perform either of the first and second operations via each of the left-hand and right-hand buttons only by changing the size of the contact surface area; and
performing, by the controller:
upon identifying the first operation in the contact surface area within the left-hand button in the first area, a first control, upon identifying the second operation in the contact surface area within the left-hand button in the first area, a second control that is different from the first control, upon identifying the first operation in the contact surface area within the right-hand button, a third control that is different from the first control and the second control, and upon identifying the second operation in the contact surface area within the right-hand button, a fourth control that is different from the first control, the second control, and the third control, such that, once the user performs the first and second operations via each of the left-hand and right-hand buttons by changing the size of the contact surface area within each of the left-hand and right-hand buttons, the first, second, third, and fourth controls are performed with respect to at least one of the object and the virtual camera.

\* \* \* \* \*